United States Patent
Yen et al.

(10) Patent No.: US 8,609,297 B2
(45) Date of Patent: Dec. 17, 2013

(54) FLAT FUEL CELL ASSEMBLY AND FABRICATION THEREOF

(75) Inventors: Yeu-Shih Yen, Changhua (TW); Chiou-Chu Lai, Taipei (TW); Ju-Pei Chen, Taipei (TW); Shu-Chen Huang, Keelung (TW); Ku-Yin Ka, Taoyuang (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1813 days.

(21) Appl. No.: 10/879,952

(22) Filed: Jun. 29, 2004

(65) Prior Publication Data

US 2005/0026026 A1   Feb. 3, 2005

(30) Foreign Application Priority Data

Jul. 29, 2003  (TW) .............................. 92120613 A
May 21, 2004  (TW) .............................. 93114372 A

(51) Int. Cl.
*H01M 4/64* (2006.01)
*H01M 8/10* (2006.01)

(52) U.S. Cl.
USPC ............ 429/483; 429/492; 429/521; 429/532

(58) Field of Classification Search
USPC .......................................... 429/36, 30, 44, 38
See application file for complete search history.

(56) References Cited

U.S. PATENT DOCUMENTS

| | | | |
|---|---|---|---|
| 5,432,023 A * | 7/1995 | Yamada et al. | 429/34 |
| 5,945,232 A * | 8/1999 | Ernst et al. | 429/413 |
| 6,218,035 B1 * | 4/2001 | Fuglevand et al. | 429/30 |
| 6,413,351 B1 * | 7/2002 | Goldman et al. | 156/278 |
| 7,138,042 B2 * | 11/2006 | Tran et al. | 204/551 |
| 2004/0219428 A1 * | 11/2004 | Nagayama | 429/218.1 |
| 2005/0202305 A1 * | 9/2005 | Markoski et al. | 429/38 |

FOREIGN PATENT DOCUMENTS

| | | | |
|---|---|---|---|
| DE | 19833064 | 2/2000 | |
| GB | 2323700 | * 9/1998 | ............... C25B 9/10 |
| WO | WO0193354 A2 | 12/2001 | |

OTHER PUBLICATIONS http://solutions.3m.com/en_US/; 3M Safety Data Sheet 3M EC-1458 (PB) Nov. 23, 2004.*
German Examination Report mailed Oct. 17, 2005.
"Design and Fabrication of a Micro Fuel Cell Array with "Flip-Flop" Interconnection" Lee, et al., 2002.

* cited by examiner

*Primary Examiner* — Barbara Gilliam
*Assistant Examiner* — Angela Martin
(74) *Attorney, Agent, or Firm* — McClure, Qualey & Rodack, LLP

(57) ABSTRACT

A connecting structure of a flat fuel cell assembly. The assembly includes a plurality of fuel cells, each of which has a membrane electrode assembly with an anode, a proton exchange membrane and a cathode combined. Two conductive nets are attached to the surfaces of the anode and the cathode of each membrane electrode assembly by thermosetting adhesive and heat pressing to collect and transmit electrons.

17 Claims, 11 Drawing Sheets

FLAT FUEL CELL ASSEMBLY AND FABRICATION THEREOF

BACKGROUND OF THE INVENTION

1. Field of the Invention

The present invention relates to a fuel cell assembly with improved connecting structure, and in particular to a fuel cell assembly having conductive nets attached thereto to transfer electrons.

2. Description of the Related Art

Fuel cells (FC) directly convert chemical energy in hydrogen and oxygen to electricity. Compared to conventional power generation devices, fuel cells produce less pollution and noise, and have higher energy density and energy conversion efficiency. Fuel cells provide clean energy, and can be used in portable electronic devices, transportation, military equipment, power generating systems, or the space industry, among many other applications.

Different fuel cells use different operating principles. Direct methanol fuel cells (DMFC), for example, use, on the anode side, methanol solution to precede oxidation, producing protons ($H^+$), electrons ($e^-$) and carbon dioxide ($CO_2$). The resulting hydrogen ions diffuse through an electrolyte toward the opposing cathode. Meanwhile, oxygen is fed to the cathode. As the proton, electrons ($e^-$) and oxygen are combined on the cathode side, water is formed. The voltage between electrodes drives electrons from the anode to the cathode sides via external loading. The net result is that the DMFC uses methanol to produce electricity, with water and carbon dioxide as by-products.

The output voltage of a single cell is too low to drive any electronic device. Several fuel cells must thus be connected in series as a fuel cell stack to provide sufficient output voltage. When connecting fuel cells, transmission of generated voltage from one fuel cell to another, especially electrons from the anode of one fuel cell to the cathode of another, must be accomplished.

In FIG. 1, a conventional fuel cell 10 includes an anode 12, a proton exchange membrane (PEM) 11 and a cathode 13, forming a membrane electrode assembly (MEA) Two gas-diffusing layers 14 thereon are formed by carbon cloth or carbon paper. Moreover, the catalyst, the MEA, the gas-diffusing layers 14, the bipolar plate 15 and the end plates 17 of the conventional fuel cell are assembled by screws 16 to provide proper electrical connection conductivity and fuel supply.

However, problems exist with the above conventional connection structure. Force provided by the screws is not uniform, increasing the resistance of the fuel cell assembly or blocking fuel passing through the grooves of the end plates 17 and the bipolar plate 15. Additionally, this structure requires extra space allowance for screws, which reduces the assembling density. For flat fuel cell assembly in a portable device, the assembling density is reduced by 30%~50% and cannot satisfy the requirement for high power density.

In conventional stacked fuel cell assembly, the bipolar plates connect the anode and the cathode of each two neighboring fuel cells and separate the required fuel as shown in FIG. 1. However, the conventional stacked fuel cells are not suited to use with portable devices, such that a new plane-arranged fuel cell assembly is needed.

U.S. Pat. No. 6,277,658 to Pratt et al. describes a method of using two plastic frames with current collectors to sandwich an MEA. However, the current collectors are metal nets, and the force exerted by the plastic frames may be not uniform, such that the metal nets do not closely contact the anodes and the cathodes of the MEA, increasing resistance and reducing output voltage of the fuel cell assembly.

Many structures and connecting methods for flat fuel cell assemblies have been disclosed, such as Rongzhong et al. (J. of Power Source, 93, 2001, 25-31), A. Heinzel et al. (Electrochemica Acta, 43, 1998, 3817-3820), S. J. Lee et al. (J. of power Source, 112, 2002, 410-418).

U.S. Pat. No. 6,277,658 to Cisar et al. also describes an improved fuel cell design for use at low pressure. The invention has an electrically conductive porous material directly bound to conductive nets comprising an insulating binding component and an electrically conductive component, such as an intimate mixture of a powder and loose fibers, to form gas-diffusing layers. These gas-diffusing layers are then bound to the MEA by heat pressing and the fuel cells are connected in series.

Problems continue to exist with the method provided by Cisar et al, since the electrically conductive porous material must be applied to different areas on opposite surfaces of a conductive net by conventional printing, uniformity of the electrically conductive porous material is hard to control. Moreover, holes in the gas-diffusing layer formed by the conventional printing process are smaller than holes in the gas-diffusing layer formed by a carbon cloth. Thus, the thickness of the printed gas-diffusing layer must be reduced or precisely controlled, but conductivity and stability of the fuel cell assembly will deteriorate.

SUMMARY OF THE INVENTION

Accordingly, the first object of the present invention is to provide improved connecting structure and method for flat fuel cell assemblies to increase the fabricating density of fuel cells and the ratio of the effective reaction area.

Another object of the present invention is to provide a connecting structure having conductive nets to connect the fuel cells in series.

The third object of the present invention is to provide a method of connecting conductive nets and the carbon layer of each fuel cell.

The fourth object of the present invention is to provide a reliable securing method for connection between the conductive nets and the fuel cells to increase conductivity.

The fifth object of the present invention is to provide a fabricating method for the flat fuel cell assembly which is easily achieved, such that the cost of the flat fuel cell assembly is reduced.

The present invention provides a method for fabricating a fuel cell. First, a proton exchange membrane, an anode and a cathode are provided. The anode and the cathode are combined on opposite sides of the proton exchange membrane, forming a membrane electrode assembly. Next, two conductive nets and a b-stage thermosetting adhesive are provided, with the b-stage adhesive transferred to the surfaces of the conductive nets. Finally, the conductive nets are individually heat pressed onto the surfaces of the anode and the cathode of the membrane electrode assembly.

A porous conductive layer is formed on or attached to the surface of the membrane electrode assembly to increase conductivity. The porous conductive layer comprises carbon paper or carbon cloth.

The conductive nets comprise nickel, titanium, copper, aluminum, or alloys thereof. The conductive nets are also coated with gold, platinum, rhodium, ruthenium, or other precious metals to prevent corrosion.

The b-stage adhesive is provided as a membrane of thickness between 1 and 100 μm and is made of epoxy, PU, PI or other polymer. The b-stage adhesive is applied to the surfaces of the conductive nets by heat pressing and may comprise a plurality of conductive particles therein to increase conductivity.

Furthermore, the operating temperature of the transfer is between 25 and 100° C., operating temperature of the heat pressing between 100 and 250° C., at between 1 and 50 MPa.

The present invention provides a fuel cell having a membrane electrode assembly with two conductive nets. The membrane electrode assembly has a proton exchange membrane, an anode and a cathode. The anode and the cathode are individually disposed on opposite sides of the proton exchange membrane. The conductive nets are fixed to the surfaces of the anode and the cathode of the membrane electrode assembly by thermosetting adhesive.

A porous conductive layer is disposed between the membrane electrode assembly and the conductive nets to increase conductivity. The porous conductive layer comprises carbon paper.

In a preferred embodiment, the adhesive is thermosetting. The thermosetting adhesive is applied on the surfaces of the conductive nets and baked, wherein the operating temperature of this baking process is between 60 and 200° C.

The present invention further provides a flat fuel cell assembly including an insulation frame and a plurality of fuel cells connected in series. The insulation frame has a plurality of openings. The fuel cells are disposed on the insulation frame, covering the openings. Each fuel cell includes a membrane electrode assembly with two conductive nets separately fixed to the surfaces of the anode and the cathode of the membrane electrode assembly by b-stage adhesive. Moreover, the neighboring fuel cells are connected in series through the conductive nets.

The conductive nets comprise nickel, titanium, copper, aluminum, or alloys thereof. Moreover, the conductive nets are also coated with gold, platinum, rhodium, ruthenium, or other anti-corrosion materials, such as CrN, to prevent corrosion.

The b-stage adhesive is provided as a membrane of thickness between 1 and 100 μm and made of epoxy, PU, PI or other macromolecular polymer. The b-stage adhesive is applied to the surfaces of the conductive nets by heat pressing and may comprise a plurality of conductive particles therein to increase conductivity.

In a preferred embodiment, the insulation frame comprises a first part with a plurality of protrusions and a second part with a plurality of corresponding recesses to secure the metal nets.

The fuel cells are attached to the insulation frame by waterproof adhesive. The fuel cells are alternatively disposed on the opposite side of the insulation frame to simplify the connecting structure of the fuel cell assembly.

The insulation frame has a plurality of connecting portions between each two neighboring openings, and a plurality of connecting electrodes embedded in the connecting portions. Moreover, the connected conductive nets of each two neighboring fuel cells are connected in series through the connecting electrodes therebetween.

Two flat fuel cell modules and an insulation frame form an enclosed space for required fuel. The insulation frame further has connecting electrodes to connect the flat fuel cell modules. Moreover, the connecting electrodes comprise a flexible printed circuit board.

The insulation frame comprises a fiber-enhanced resin or a ceramic plate and has a plurality of holes to admit or expel the required fuel of the fuel cell assembly.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
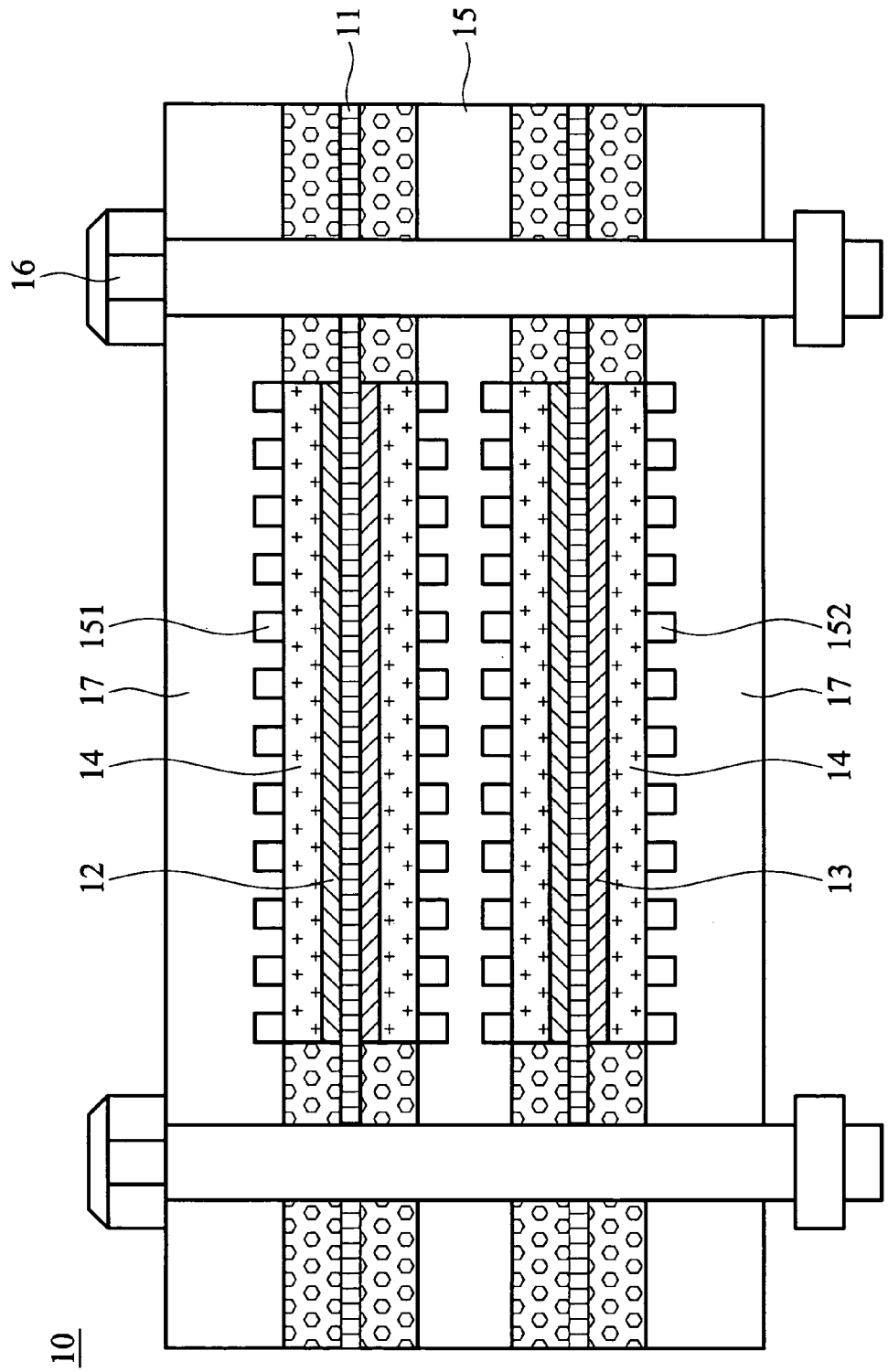
FIG. 1 is cross section of a conventional fuel cell as referenced in the related art.
Figure 2A:
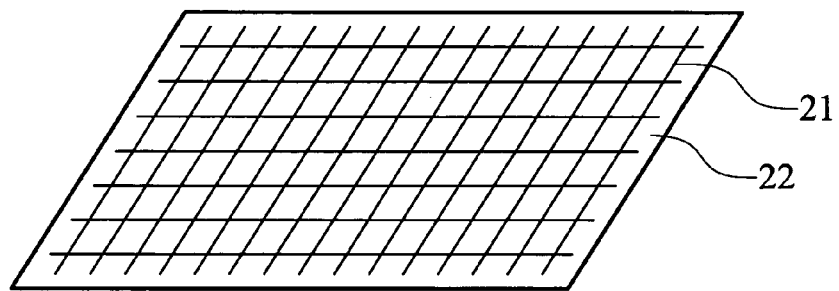
FIG. 2A is a schematic view showing application of b-stage adhesive to a conductive net of the invention.

FIG. 2A is a schematic view showing application of b-stage adhesive to a conductive net of the invention. In FIG. 2A, the b-stage thermosetting adhesive is provided as a membrane 22 to bind the conductive nets and the membrane electrode assembly (MEA) of each fuel cell of the present invention. The thickness of the membrane 22 is between 1 and 100 μm, preferably 40 μm. The b-stage thermosetting adhesive comprises epoxy, PU, PI or other polymer, is transferred to the surface of the conductive nets 21 by heat pressing at an operating temperature between 25 and 100° C. and operating pressure smaller than 5 MPa, depending on the material of the b-stage, at a thickness between 1 and 100 μm.

The above thermosetting adhesive also can be applied on the surfaces of the conductive nets by coating or spraying. The conductive nets with adhesive are soft baked, such that the adhesive can be firmly attached thereon. The operating temperature of this baking process is between 60 and 200° C.

Figure 2B:
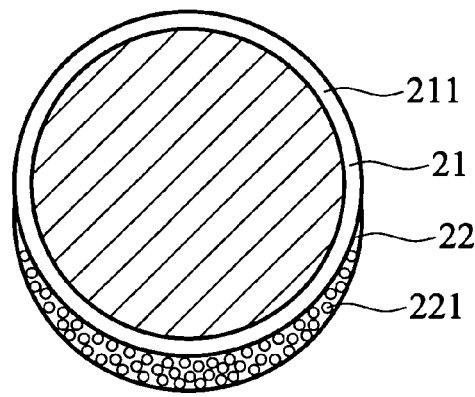
FIG. 2B is a cross section of the conductive net with adhesive thereon in FIG. 2A.

FIG. 2B is a cross section of the conductive net with adhesive thereon in FIG. 2A. In FIG. 2B, conductive nets 21 comprise nickel, titanium, copper, aluminum, or alloys thereof. The conductive nets 21 are also coated with gold, platinum, rhodium, ruthenium, or other anti-corrosion materials 211, such as CrN, to prevent corrosion. Moreover, to increase conductivity, the b-stage adhesive 22 may further comprise a plurality of conductive particles 221, such as gold, titanium, or carbon.

Figure 3A:
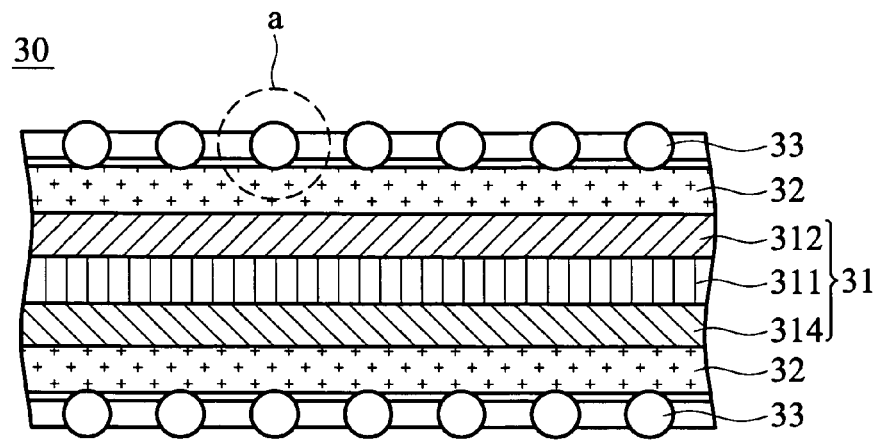
FIG. 3A is a cross section of the fuel cell of the invention.
Figure 3B:
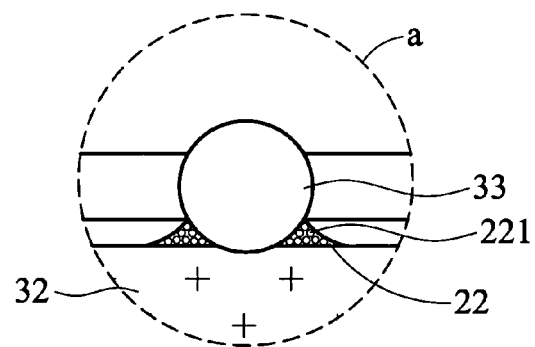
FIG. 3B is an enlarged view of area (a) in FIG. 3A.

FIG. 3A is a cross section of the fuel cell of the invention. FIG. 3B is an enlarged view of area (a) in FIG. 3A. In FIG. 3A, the fuel cell 30 has an MEA 31 and two conductive nets 33. The MEA 31 includes a proton exchange membrane 311 (PEM), an anode 312 and a cathode 313, with anode 312 and cathode 313 individually bound on the opposite side of the PEM 311. Furthermore, the anode 312 and the cathode 313 of the MEA 31 are bound by conventional heat pressing or printing.

To increase conductivity and gas permeability of the MEA 31, two gas-diffusing layers 32 of carbon paper or cloth are formed on or attached to the surface of the MEA 31. The gas-diffusing layers 32 are heat pressed thereon when combining the anode 312, cathode 313 and proton exchange membrane 311, becoming a part of the MEA.

In FIGS. 2B and 3A~3B, after heat pressing and adhesive application, the metal nets 33 are combined on the opposite surfaces of the MEA 31 by heat pressing, during which the b-stage adhesive 22 is deployed as shown in FIG. 3B. Finally, the b-stage adhesive 22 is solidified by high operating temperature and bonds the metal nets 33 to the surfaces of the gas-diffusing layers 32. The operating temperature of the heat pressing is between 100 and 250° C., at an operating pressure between 1 MPa and 50 MPa, for between 1 and 5 minutes.

For optimal conductivity between the metal nets 33 and the gas-diffusing layers 32, operating temperature is 160° C., with operating pressure of 30 MPa and bonding time of 3 minutes.

Figure 3C:
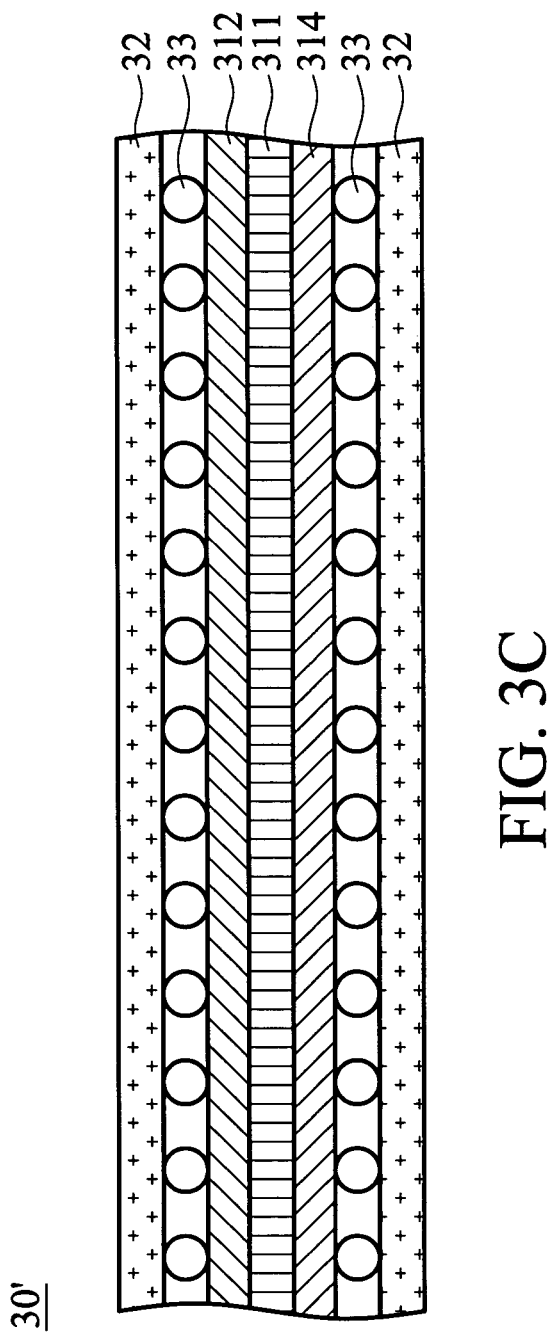
FIG. 3C is a cross section showing another workable structure of the fuel cell of the invention.

Furthermore, the gas-diffusing layers 32 on the MEA 31 of the invention can be eliminated. The metal nets 33 are directly bonded to the surfaces of the anode 312 and cathode 313 of the MEA 31 by the adhesive. Additionally, metal nets 33 can be individually bonded to one surface of the anode 312 and the cathode 314 first, with the gas-diffusing layers 32 heat-pressed thereon as shown in FIG. 3C.

First Embodiment

Figure 4A:
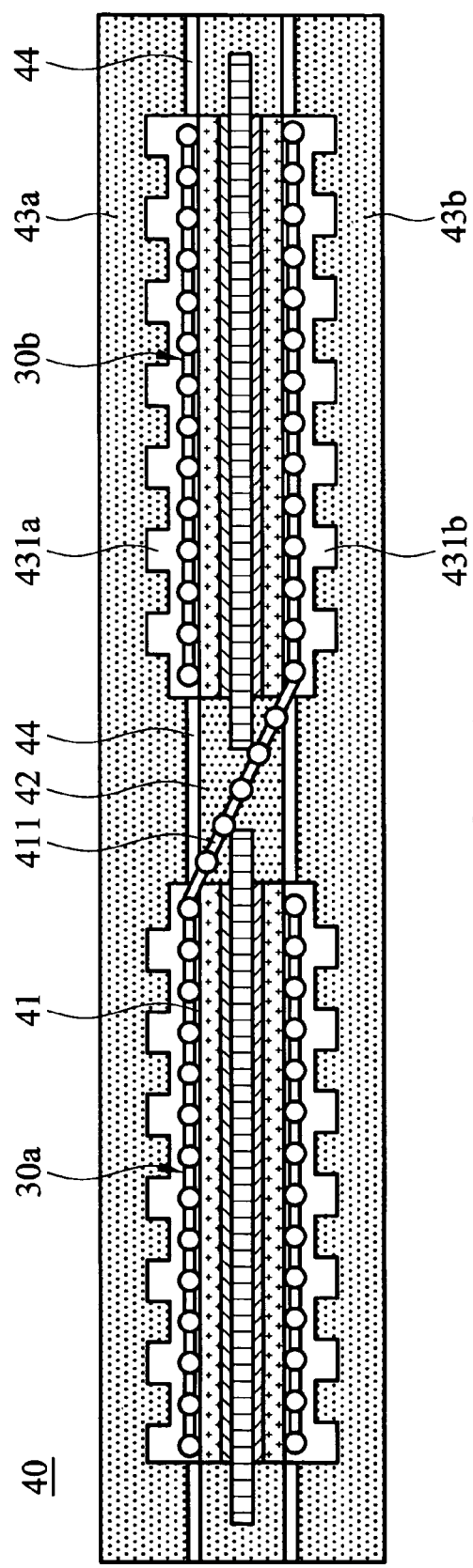
FIG. 4A is a cross section of the flat fuel cell assembly in a first embodiment of the invention.

FIG. 4A is a cross section of the flat fuel cell assembly in a first embodiment. To simplify the drawing, the fuel cell assembly shows only, but is not limited to, two fuel cells.

In FIG. 4A, the fuel cell assembly 40 has two fuel cells 30a, 30b, an insulation frame 42, and two flow-guiding plates 43a, 43b. A metal net 41 is first bonded to the anode of the fuel cell 30a and the cathode of the fuel cell 30b by the b-stage adhesive, forming a connecting electrodes therebetween. The flexing portion 411 of the connecting metal nets 41 is embedded in the center portion of the insulation frame 42, which can protect the flexing portion 411 from damage. Furthermore, the insulation frames 42 comprise a ceramic plate, or are formed of PC, PE, fiber-enhanced resin, or other polymer by injection molding.

Figure 4B:
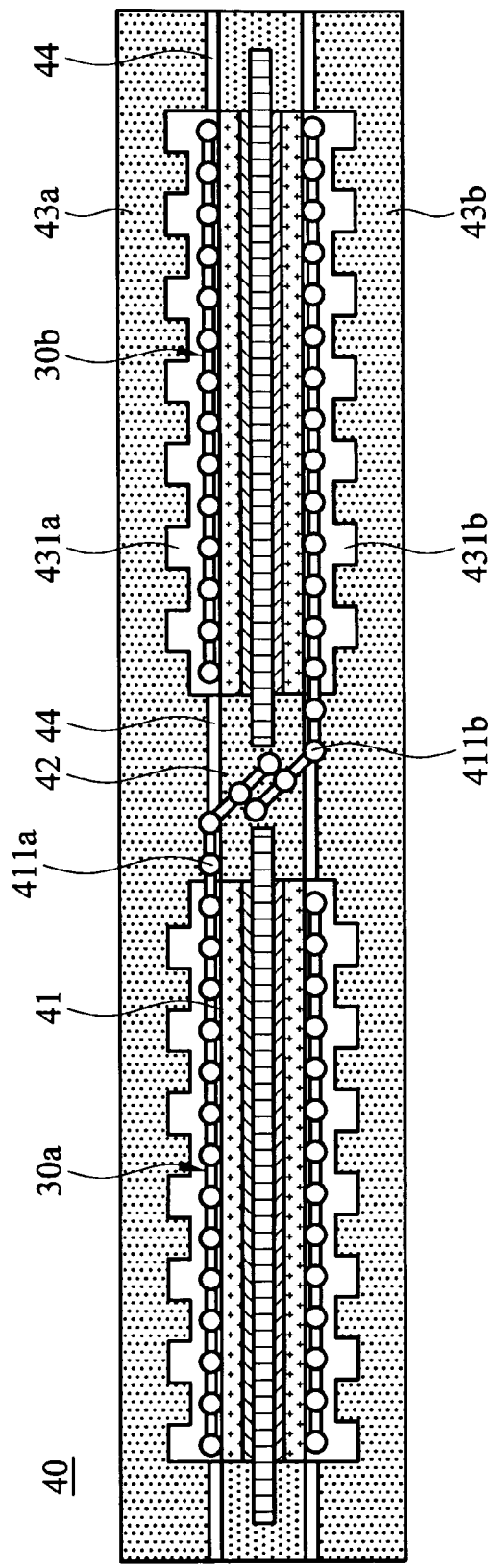
FIGS. 4B~4D are a cross section of other possible kinds of flat fuel cell assembly in the first embodiment.

Furthermore, the connecting metal nets of the fuel cell assembly 40 can be two metal nets combined within the connecting portion as shown in FIG. 4B.

Figure 4C:
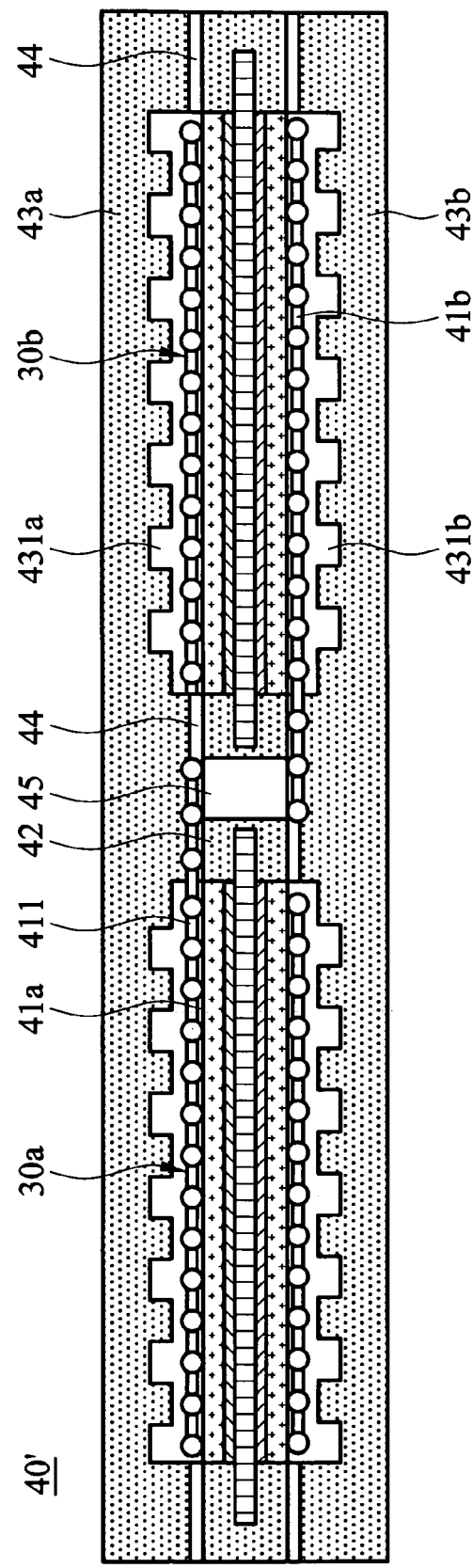

FIG. 4C is a cross section of another flat fuel cell assembly in the first embodiment. In FIG. 4C, the fuel cells 30a, 30b are connected in series by the connecting electrodes 45 embedded in the center portion of the insulation frame 42. The metal nets 41a, 41b are bonded to the connecting electrodes 45 by b-stage adhesive or direct heat pressing. The metal nets also can be soldered with the connecting electrodes 45, forming a flat fuel cell assembly 40'.

Figure 4D:
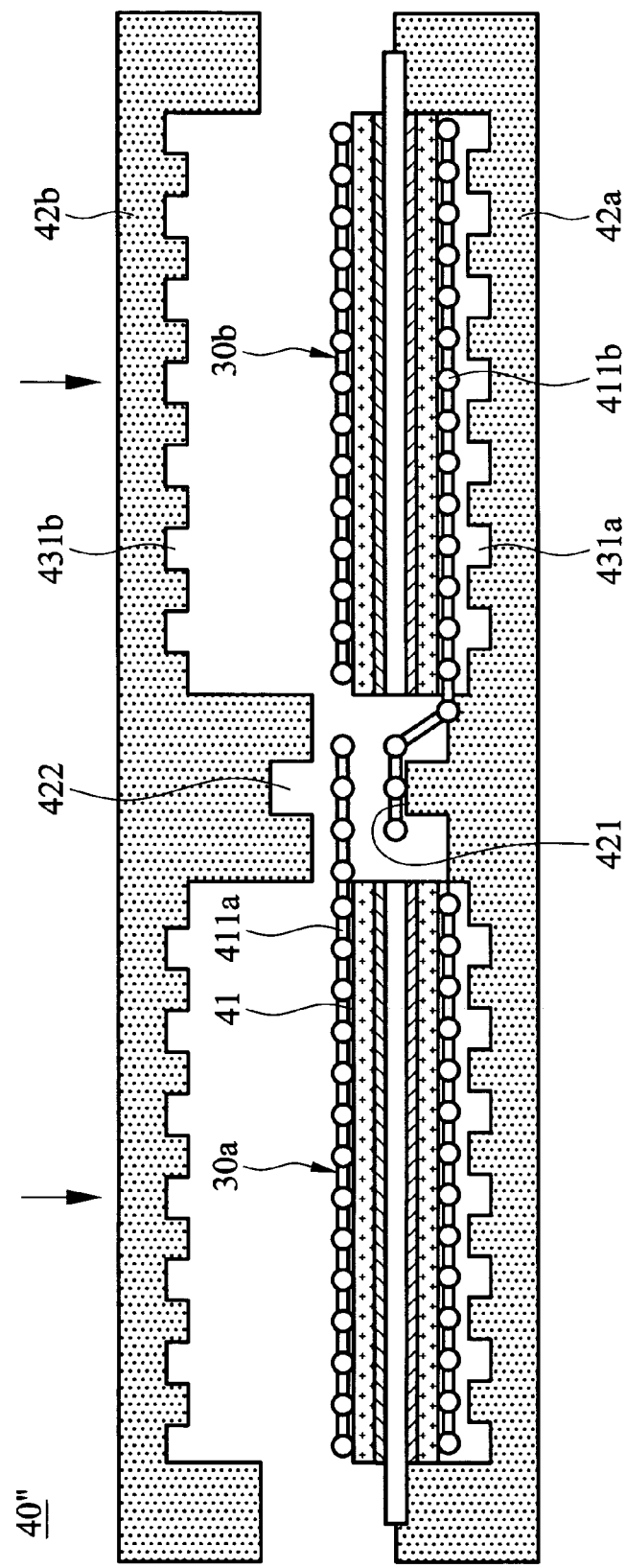

In FIG. 4D, the insulation frame can be combined with the conventional flow-guiding plates and comprises a first part with a plurality of protrusions and a second part with a plurality of corresponding recesses. When assembling the flat fuel cell assembly 40", the fuel cells 30a, 30b are disposed on the first part, and the second part is pressed thereon. Simultaneously, the metal nets are connected through these protrusions and recesses.

The bonded metal nets of the flat fuel cell assembly shown in FIGS. 4A and 4B collect charges produced by the fuel cells, thus the flow-guiding plates 43a, 43b can be made of PC, PE or other insulating macromolecular compound, other than graphite. In the flow-guiding plates 43a, 43b a plurality of grooves 431a, 431b introduce the fuel. Flow-guiding plates 43a, 43b are attached to the insulation frame 42 and sealed by waterproof adhesive 44, such that the flat fuel cell assembly 40 in the first embodiment is suited to use with proton exchange membrane fuel cells (PEMFC) or direct methanol fuel cells (DMFC).

Moreover, the gas-diffusing layer of the fuel cell is eliminated, such that the metal nets can be directly bonded to the surfaces of the anode or the cathode. Alternatively, the metal nets can be first heat-pressed onto the surfaces of the anode or the cathode, and gas-diffusing layers heat pressed thereon, forming the structure shown in FIG. 3B.

Second Embodiment

Figure 5A:
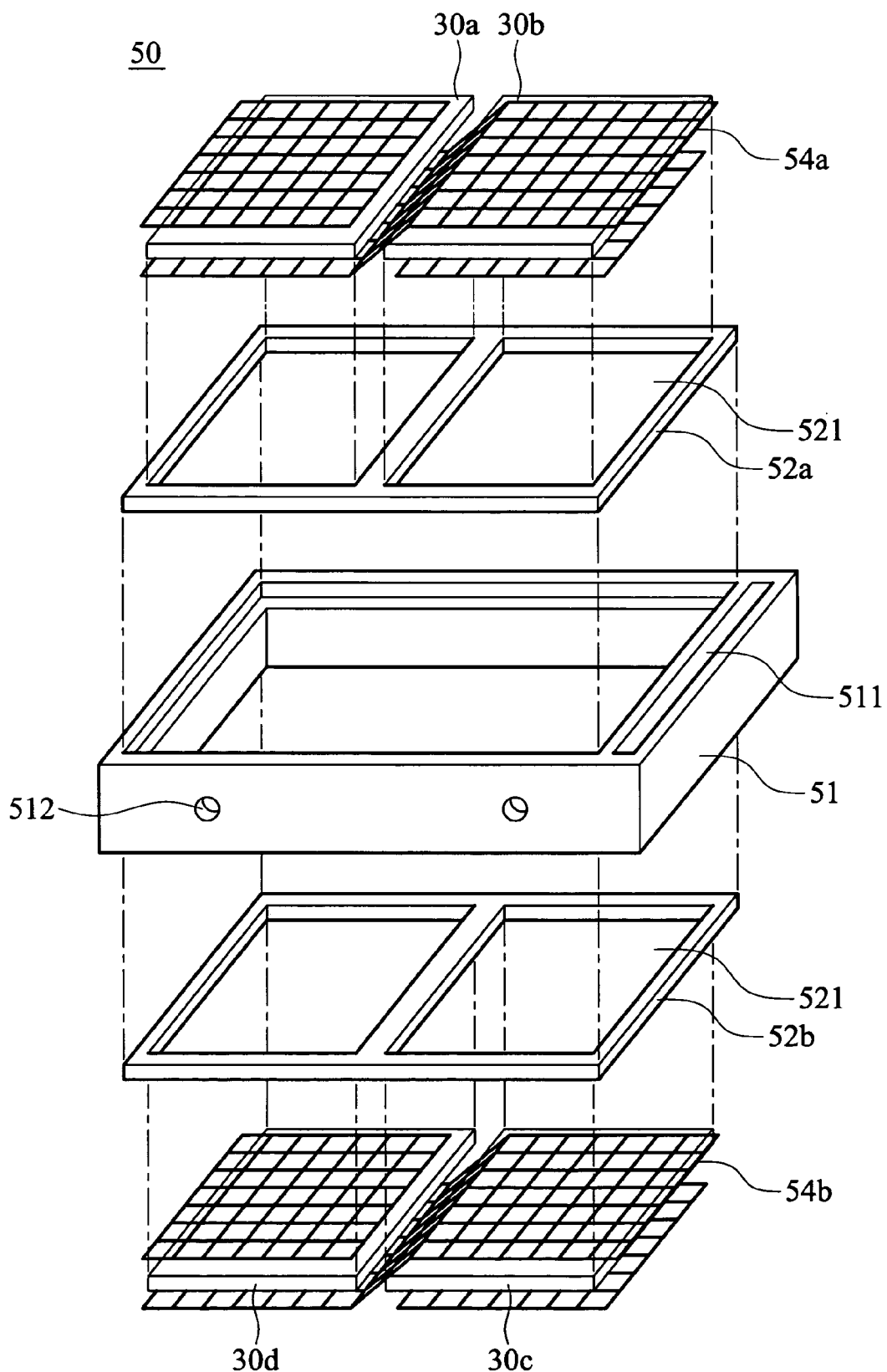
FIG. 5A is an exploded perspective view of the flat fuel cell assembly in a second embodiment of the invention.
Figure 5B:
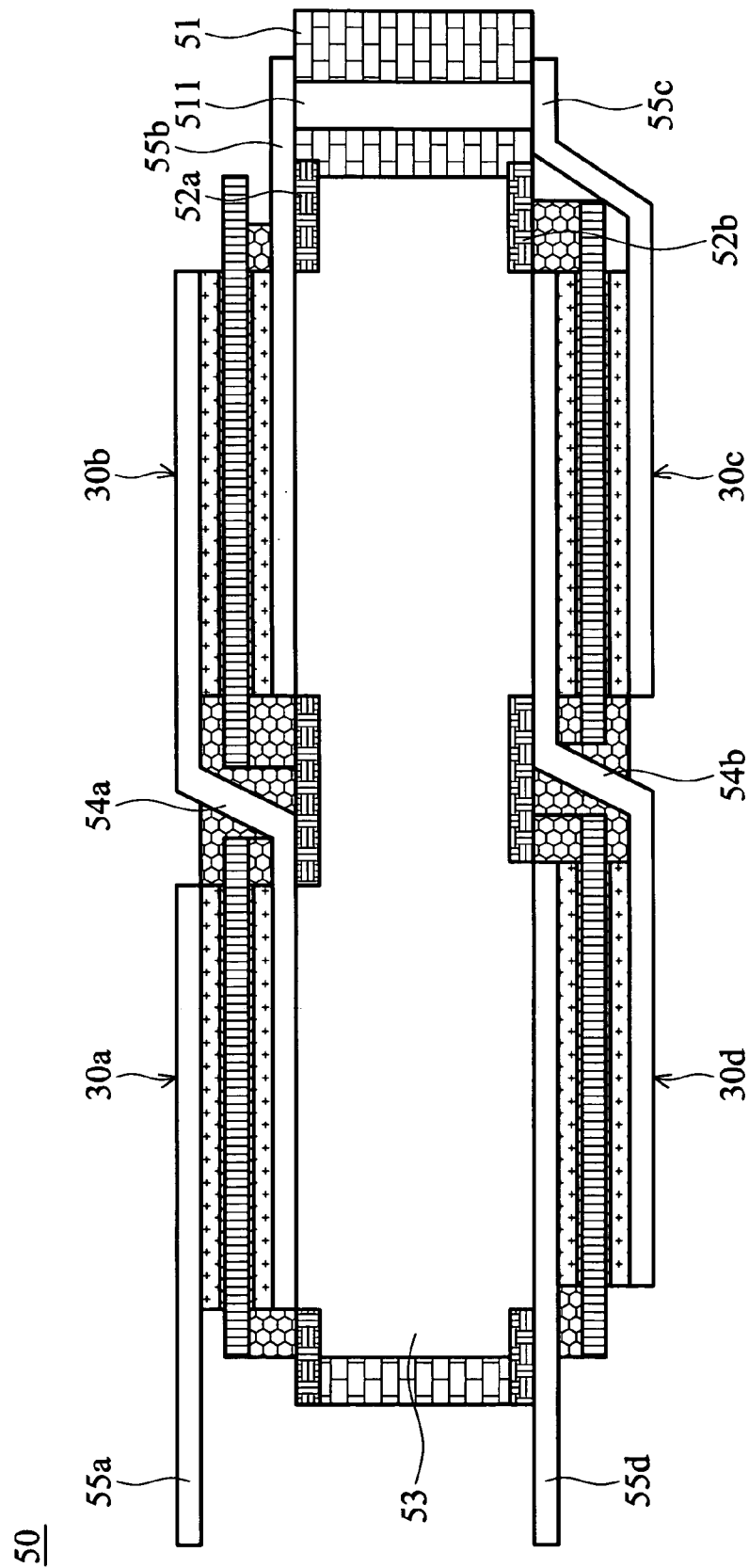
FIG. 5B is a cross section of the flat fuel cell assembly in FIG. 5A.

FIG. 5A is an exploded perspective view of the flat fuel cell assembly in the second embodiment, and FIG. 5B a cross section thereof. To simplify the drawings, the flat fuel cell assembly 50 is shown with, but is not limited to, four fuel cells 30a~30d.

In FIG. 5A, the flat fuel cell assembly 50 includes an insulation frame and a plurality of fuel cells 30a~30d connected in series. The insulation frame includes an enclosure 51 and two covers 52a, 52b. The enclosure 51 is a rectangular insulation frame to support the covers 52a, 52b, and a connecting electrodes 511 is embedded in a sidewall thereof. The covers 52a, 52b both have two rectangular openings 521. The fuel cells 30a~30d are disposed on the covers 52a, 52b, covering the openings 521. Moreover, the covers 52a, 52b can be prepared according the structure of the flat fuel cells as shown in FIGS. 4B~4D and combined with the enclosure 51. The enclosure 51 and the covers 52a, 52b of the insulation frame comprise PC, PE, fiber-enhanced resin, or are ceramic plates.

The structure of each fuel cell 30a~30d in the second embodiment is identical to that shown in FIG. 3A. Each fuel cell 30a~30d has an MEA with a heat pressed PEM, anode, and cathode. Additionally, two gas-diffusing layers of carbon paper or cloth are bonded thereon.

In FIGS. 5A and 5B, during fabrication of flat fuel cell assembly 50 of the second embodiment, metal nets 55a~55d are first bonded to one surface of each fuel cell 30a~30d using b-stage adhesive and heat pressing. Next, a larger metal net 54a, 54b is applied to connect the anode of a first fuel cell and the cathode of a second fuel cell, forming a dual-cell module. Next, the dual-cell modules are separately bonded to the covers 52a, 52b by waterproof adhesive, covering the openings 521. After that, the covers 52a, 52b of the insulation frame are attached to the enclosure 51 by waterproof adhesive, the insulation frame and the fuel cells 30a~30b disposed thereon, thus forming an enclosed space 53 to hold the required liquid fuel. Finally, the metal nets 55b, 55c are connected to the connecting electrodes 511 by anisotropic conductive film (ACF) or soldering, forming a complete flat fuel cell assembly 50 providing sufficient output voltage for electronic devices. Moreover, metal nets 55a, 55b act as the positive and negative electrodes of the flat fuel cell assembly 50. The conductive nets 54a, 54b, 55a~55d comprise nickel, titanium, copper, aluminum, or alloys thereof, and are coated with gold, platinum, rhodium, ruthenium, or other anti-corrosion materials, such as CrN, to prevent corrosion.

Moreover connected electrode 511 can be replaced by a flexible connector or conducting net 55b and 55c directly.

In FIGS. 5A, 5B, the anode of each fuel cell covers the openings of the insulation frame, such that the flat fuel cell assembly 50 in the second embodiment is suited to use with DMFCs. The required methanol solution can be introduced into the enclosed space 53 through holes 512, and required oxygen directly from the atmosphere or provided by an additional pump system.

Third Embodiment

During fabrication of dual-cell modules of the second embodiment shown in FIG. 5A, the metal nets 54a, 54b are difficult to flex and bond to two fuel cells at the same time. Accordingly, the present invention provides another easily fabricated structure for the flat fuel cell assembly.

Figure 6:
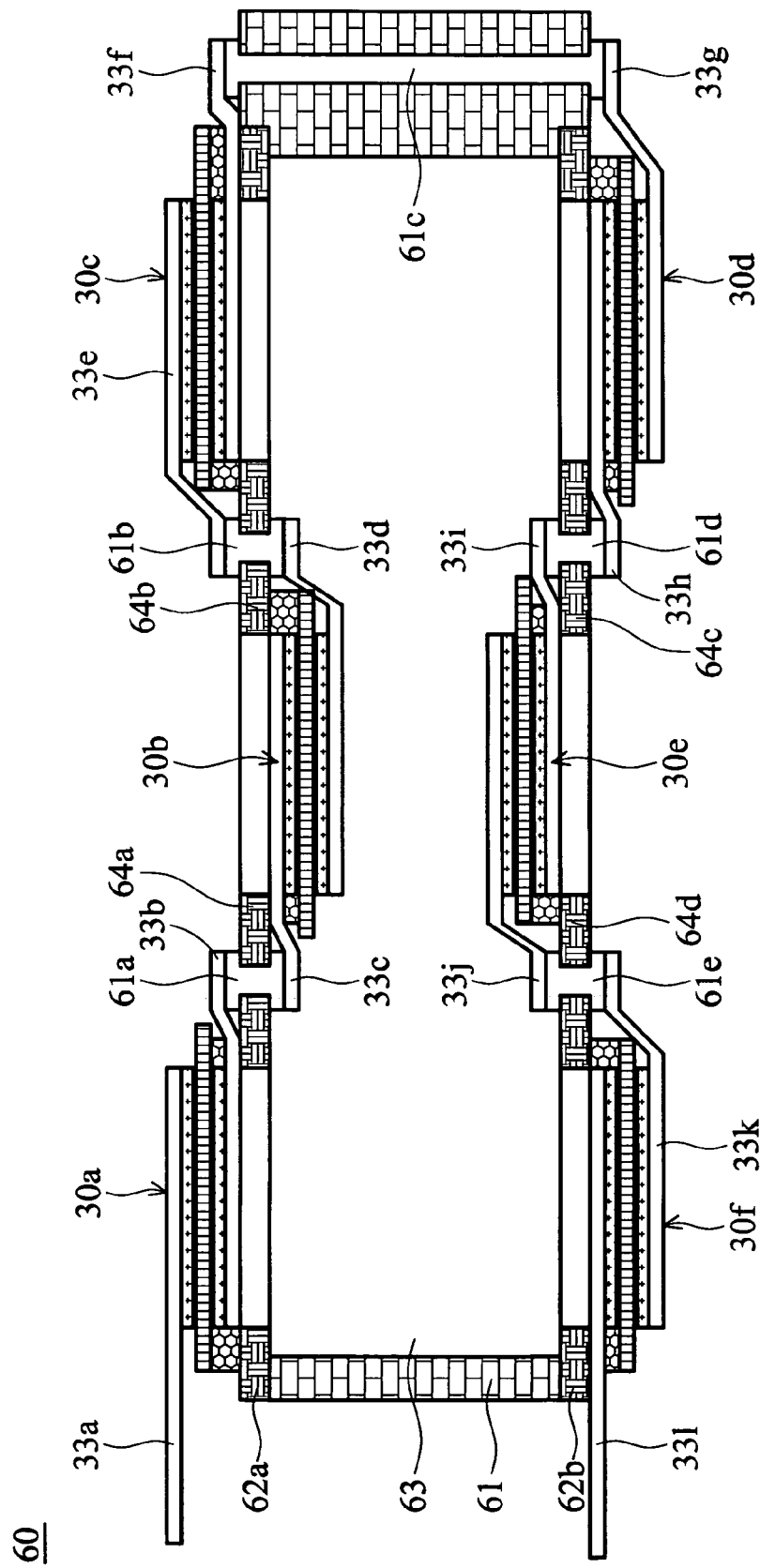
FIG. 6 is a cross section of the flat fuel cell assembly in a third embodiment of the invention.

FIG. 6 is a cross section of the flat fuel cell assembly in the third embodiment of the invention. To simplify the drawings, the flat fuel cell assembly 60 is shown with, but is not limited to, six fuel cells 30a~30f. In FIG. 6, the flat fuel cell assembly 60 includes an insulation frame and a plurality of fuel cells 30a~30f connected in series. The insulation frame has an enclosure 61 and two covers 62a, 62b. The enclosure 61, similar to the second embodiment, is a rectangular insulation frame to support the covers 62a, 62b, and a connecting electrodes 61c is embedded in a sidewall thereof. The covers 62a, 62b both have three rectangular openings. The fuel cells 30a~30f are disposed on the covers 62a, 62b, covering the openings. Moreover, four connecting electrodes 61a~61d are embedded in the connecting portions 64a~64d between each two openings. The connecting electrodes 61a~61d are used to connects the metal nets bonded to the anode of a superior fuel cell and the cathode of a neighboring inferior fuel cell.

The enclosure 61 and the covers 62a, 62b of the insulation frame comprise PC, PE, fiber-enhanced resin, or comprise ceramic plates.

The structure of each fuel cell 30a~30f in the third embodiment is identical to the structure shown in FIG. 3A. Each fuel cell 30a~30f has an MEA with a heat pressed PEM, anode, and cathode. Additionally, two gas-diffusing layers of carbon paper or cloth are bonded thereon.

In FIG. 6, to improve the structure of the flat fuel cell assembly 60, the fuel cells 30b, 30e are disposed on the interior surface of the insulation frame (61, 62a, 62b), and fuel cells 30a~30f are alternatively disposed on the opposite side of the insulation frame. During fabrication of flat fuel cell assembly 60 of the third embodiment, metal nets 33a~33l are bonded to both surfaces of each fuel cell 30a~30f by b-stage adhesive and heat pressing. Next, the fuel cells 30a~30f are alternatively bonded to opposite sides of the covers 62a, 62b by waterproof adhesive, covering the openings to prevent liquid fuel from leaking. Then, metal nets 33b~33e, 33h~33k are connected to the connecting electrodes 61a, 61b, 61d, 61e by anisotropic conductive film (ACF) or soldering, forming two flat fuel cell modules. Next, the covers 62a, 62b of the insulation frame are attached to the enclosure 61 by waterproof adhesive, the insulation frame and the fuel cells cell 30a~30f disposed thereon thus forming an enclosed space 63 to hold required liquid fuel. Finally, the metal nets 33f, 33g are connected to the connecting electrodes 61c by anisotropic conductive film (ACF) or soldering, forming a complete flat fuel cell assembly 60 providing sufficient output voltage for electronic devices.

Moreover, the metal nets 33a, 33l act as the positive and negative electrodes of the flat fuel cell assembly. The conductive nets 33a~33l comprise nickel, titanium, copper, aluminum, or alloys thereof, and are coated with gold, platinum, rhodium, ruthenium, or other precious metals to prevent corrosion.

In FIGS. 5 and 6, the anode of each fuel cell 30a~30f covers the openings of the insulation frame, such that the flat fuel cell assemblies 50, 60 in the second and third embodiment is suited to use with DMFCs and PEMFC. The required fuel, such as $H_2$ or methanol solution can be introduced into the enclosed space 53, 63, and required oxygen can be received directly from the atmosphere or provided by an additional pump system.

Furthermore, the enclosed space 53, 63 can be used to introduce air or oxygen when each fuel cell 30a~30f is disposed on the cover 52a, 52b or 62a, 62b of the insulation frame with cathode facing inward. The required fuel, such as hydrogen or methanol solution, can be applied outwardly. The fuel, can, for example, pass through the grooves of the flow-guiding plates in the first embodiment. Thus, the structure of the flat fuel cell assembly 50, 60 is suited to use with the conventional PEMFCs and DMFCs.

Accordingly, the present invention provides improved connecting structure and method for flat fuel cell assemblies, to increase the fabricating density of fuel cells and the ratio of the effective reaction area. Metal nets are applied to each fuel cell by conductive b-stage adhesive through heat pressing, which not only improves conductivity between the metal nets and carbon layers of each fuel cell but also simplifies the fabricating process, thus reducing the cost of the flat fuel cell assembly.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flat fuel cell assembly, comprising:
   an insulation frame comprising at least one opening; and
   at least one fuel cell disposed on the insulation frame, covering the opening, wherein each fuel cell comprising:
   a membrane electrode assembly comprising a proton exchange membrane, an anode and a cathode, wherein the anode and the cathode are individually disposed on opposite sides of the proton exchange membrane, wherein the membrane electrode assemblies are coated with a porous conductive layer comprising carbon paper or carbon cloth; and
   two conductive nets separately fixed to the surfaces of the anode and the cathode of the membrane electrode assembly by b-stage adhesive, wherein each conductive net is in direct contact with the porous conductive layer.

2. The flat fuel cell assembly as claimed in claim 1, wherein the conductive nets comprise nickel, titanium, copper, aluminum, or alloys thereof, and the conductive nets are coated with gold, platinum, rhodium, ruthenium, or CrN.

3. The flat fuel cell assembly as claimed in claim 1, wherein the insulation frame comprises a plurality of openings, the flat fuel cell assembly comprises a plurality of fuel cells disposed on the insulation frame, covering the openings, and the neighboring fuel cells are directly connected in series through the conductive nets.

4. The flat fuel cell assembly as claimed in claim 3, wherein the connected conductive nets of each two neighboring fuel cells are combined by heat pressing.

5. The flat fuel cell assembly as claimed in claim 3, wherein the insulation frame comprises a plurality of connecting portions between each two neighboring openings, and a plurality of connecting electrodes are embedded in the connecting portions.

6. The flat fuel cell assembly as claimed in claim 5, wherein the connected conductive nets of each two neighboring fuel cells are connected in series through the connecting electrodes therebetween.

7. The flat fuel cell assembly as claimed in claim 3, further comprising:
a plurality of flow-guiding plates fixed to the insulation frame by waterproof adhesive, comprising a plurality of grooves to introduce fuel into the fuel cell assembly.

8. The flat fuel cell assembly as claimed in claim 3, wherein the insulation frame comprises a fiber-enhanced resin or a ceramic plate.

9. The flat fuel cell assembly as claimed in claim 3, wherein the insulation frame comprises a first part with a plurality of protrusions and a second part with a plurality of corresponding recesses.

10. The flat fuel cell assembly claimed as claim 3, wherein the insulation frame and the fuel cells form an enclosed space, and the anode and the cathode are individually disposed on the opposite side of the proton exchange membrane by heat pressing.

11. The flat fuel cell assembly as claimed in claim 10, wherein the fuel cells are attached to the insulation frame by waterproof adhesive comprising b-stage epoxy, polyurethane (PU), or polyimide (PI).

12. The flat fuel cell assembly as claimed in claim 10, wherein the insulation frame comprises a plurality of connecting portions between each two neighboring openings, with a plurality of connecting electrodes embedded therein.

13. The flat fuel cell assembly as claimed in claim 10, wherein the connected conductive nets of each two neighboring fuel cells are connected in series through the connecting electrodes therebetween.

14. The flat fuel cell assembly as claimed in claim 13, wherein the fuel cells are alternatively disposed on the opposite side of the insulation frame.

15. The flat fuel cell assembly as claimed in claim 14, wherein the insulation frame comprises a plurality of holes to admit or expel the fuel for the fuel cell assembly.

16. The flat fuel cell assembly as claimed in claim 10, wherein the insulation frame comprises a fiber-enhanced resin or a ceramic plate.

17. The flat fuel cell assembly as claimed in claim 1, wherein the b-stage adhesive comprises epoxy, polyurethane (PU), or polyimide (PI) with a plurality of conductive particles therein.

* * * * *